(12) United States Patent
Matsumoto

(10) Patent No.: US 10,247,876 B2
(45) Date of Patent: Apr. 2, 2019

(54) DISPLAY DEVICE CIRCUIT BOARD, DISPLAY DEVICE, AND ELECTRONIC DEVICE

(71) Applicant: E Ink Corporation, Billerica, MA (US)

(72) Inventor: Akihito Matsumoto, Chino (JP)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/841,832

(22) Filed: Dec. 14, 2017

(65) Prior Publication Data

US 2018/0180797 A1 Jun. 28, 2018

(30) Foreign Application Priority Data

Dec. 27, 2016 (JP) .................................. 2016-254148

(51) Int. Cl.
| | |
|---|---|
| *F21V 19/00* | (2006.01) |
| *F21V 8/00* | (2006.01) |
| *G02F 1/1345* | (2006.01) |
| *G02F 1/167* | (2019.01) |
| *G04G 9/00* | (2006.01) |
| *G02F 1/1335* | (2006.01) |

(52) U.S. Cl.
CPC ........... *G02B 6/0083* (2013.01); *G02B 6/009* (2013.01); *G02B 6/0091* (2013.01); *G02F 1/13452* (2013.01); *G02F 1/167* (2013.01); *G02F 2001/133616* (2013.01); *G04G 9/00* (2013.01)

(58) Field of Classification Search
CPC ......... F21S 4/001; F21V 19/008; F21V 23/06
USPC .......................................................... 362/382
See application file for complete search history.

(56) References Cited

U.S. PATENT DOCUMENTS

| | | | |
|---|---|---|---|
| 9,835,888 B2* | 12/2017 | Sato | .................. G02F 1/133305 |
| 2006/0097364 A1 | 5/2006 | Shinojima | |
| 2012/0314383 A1* | 12/2012 | Oohira | ................ G02F 1/13452 361/749 |
| 2015/0131024 A1* | 5/2015 | Sakamoto | ............. G02F 1/1345 349/58 |
| 2017/0311442 A1* | 10/2017 | Eom | ...................... H05K 1/028 |
| 2018/0081225 A1* | 3/2018 | Lee | ................... G02F 1/133308 |

FOREIGN PATENT DOCUMENTS

| | | |
|---|---|---|
| JP | 2006-133448 A | 5/2006 |
| JP | 2009-080340 A | 4/2009 |
| JP | 2011-186392 A | 9/2011 |

* cited by examiner

*Primary Examiner* — Ahshik Kim
(74) *Attorney, Agent, or Firm* — Zhen Bao

(57) ABSTRACT

Provided is a display device circuit board that includes a flexible substrate having a base portion, a connector mounting portion disposed along a first direction from the base portion, a light emitter mounting portion, and an arm portion connecting the base portion and the light emitter mounting portion, and a connector reinforcing plate provided on one main surface of the connector mounting portion, in which a gap is interposed between the light emitter mounting portion and the connector mounting portion and between the arm portion and the connector mounting portion.

12 Claims, 12 Drawing Sheets

DISPLAY DEVICE CIRCUIT BOARD, DISPLAY DEVICE, AND ELECTRONIC DEVICE

BACKGROUND

1. Technical Field

The present invention relates to a display device circuit board, a display device, and an electronic device.

2. Related Art

An electrophoretic display device is a display device that can perform display for a long time because the power consumption thereof is small. Consequently, it is expected to be developed for application in portable devices, information devices, and the like.

However, for viewing the electrophoretic display device in a dark place, external illumination is necessary. Therefore, by providing an illumination device, display in a dark place is made possible.

For example, JP-A-2011-186392 discloses an electrophoretic display device in which a light source is provided on the outer periphery of an electrophoretic display panel in order to illuminate an electrophoretic display layer. According to such a configuration, because the light source can be arranged in a non-display area of the electrophoretic display panel where no image is displayed, the space inside the device can be effectively utilized. As a result, a compact electrophoretic display device can be realized.

Moreover, a flexible substrate is disposed between the light source and a circuit board, and is electrically connected via electric wiring.

In recent years, as the size of the electrophoretic display device has been further reduced, it has been necessary to more effectively utilize the space inside the device. Moreover, together with this, it is becoming increasingly difficult to assemble the device. In particular, mounting the flexible substrate accurately in a small enclosure is likely to cause a reduction in working efficiency.

SUMMARY

An advantage of some aspects of the invention is that there are provided a display device circuit board, the display device circuit board being compatible with size reduction and high precision mounting work when mounted in a display device, and a display device and an electronic device which are small but highly reliable.

Such an advantage can be achieved in the following aspects of the invention. A display device circuit board according to a first aspect of the invention includes a flexible substrate having a base portion, a connector mounting portion protruding forward in a first direction from the base portion, and a light emitter mounting portion provided forward in the first direction more than the connector mounting portion, and an arm portion protruding from the base portion forward in the first direction and connecting the base portion and the light emitter mounting portion, and a connector reinforcing plate provided on one main surface of the connector mounting portion, in which a gap is interposed between the light emitter mounting portion and the connector mounting portion and between the arm portion and the connector mounting portion.

Consequently, a display device circuit board which is compatible with size reduction and high accuracy of mounting work when mounted on a display device can be obtained.

It is preferable that, in the display device circuit board of the invention, in the flexible substrate, the arm portion includes two arm portions, the two arm portions being positioned on either side of the connector mounting portion in a second direction that intersects with the first direction.

Consequently, the shape of the flexible substrate can easily be made symmetrical, so that, for example, when the connector mounting portion or the arm portion is bent, it is difficult for twisting to occur. As a result, the connector mounting portion and the light emitter mounting portion can be routed more accurately toward the intended position, and the reliability and ease of assembly of the display device can be enhanced.

It is preferable that, in the display device circuit board of the invention, the flexible substrate further includes a pixel circuit connection portion protruding backward in the first direction from the base portion.

Consequently, the display device circuit board and a pixel circuit can be electrically connected to each other.

It is preferable that, in the display device circuit board of the invention, the flexible substrate further includes a support portion positioned behind the base portion in the first direction.

Consequently, the display device circuit board can be easily and stably fixed.

It is preferable that the display device circuit board of the invention further includes a light emitter reinforcing plate provided on one main surface of the light emitter mounting portion.

By providing the light emitter reinforcing plate, operability when arranging a light emitter on the other main surface of the light emitter mounting portion is improved. Further, when the light emitter reinforcing plate is also used to support a light guide plate, the light emitter and the light guide plate can be arranged more accurately.

It is preferable that, in the display device circuit board of the invention, the connector reinforcing plate has a cutout formed at an outer edge thereof.

As a result, the display device circuit board has a function of improving the positioning accuracy when the connector reinforcing plate is attached to the connector mounting portion.

It is preferable that, in the display device circuit board of the invention, the connector mounting portion has an opening or a cutout.

That is, because it is possible to easily determine the degree of misalignment of the connector reinforcing plate on the basis of the appearance of the opening or the cutout formed in the connector mounting portion, the inspection process can be efficiently and accurately performed.

It is preferable that, in the display device circuit board of the invention, the connector mounting portion further include a connector provided on the other main surface of the connector mounting portion.

Consequently, the display device circuit board and a control board can be electrically connected to each other via the connector.

It is preferable that the display device circuit board of the invention further includes a light emitter provided on the other main surface of the light emitter mounting portion.

Consequently, the light emitter and the circuit board for the display device can be electrically connected.

A display device according to a second aspect of the invention includes the display device circuit board of the invention.

Consequently, a highly reliable display device can be obtained even in a small size.

It is preferable that, in the display device of the invention, the flexible substrate is bent so that the other main surface of the connector mounting portion and the one main surface of the light emitter mounting portion face each other.

Consequently, since the connector can be arranged on the one main surface of the connector mounting portion, it becomes easier to insert the control board between the connector mounting portion and the pixel circuit. Moreover, because the light emitter reinforcing plate can be disposed on the other main surface of the light emitter mounting portion, the light emitter can be disposed on the one main surface of the light emitter mounting portion and alignment between the light guide plate and the light emitter becomes easy, for example, in a display device of the front light type.

An electronic device according to a third aspect of the invention includes the display device of the invention.

Consequently, an electronic device with high reliability can be obtained even in a small size.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of a display device circuit board, a display device, and an electronic device according to the invention will be described below with reference to the accompanying drawings.

Display Device

Figure 1:
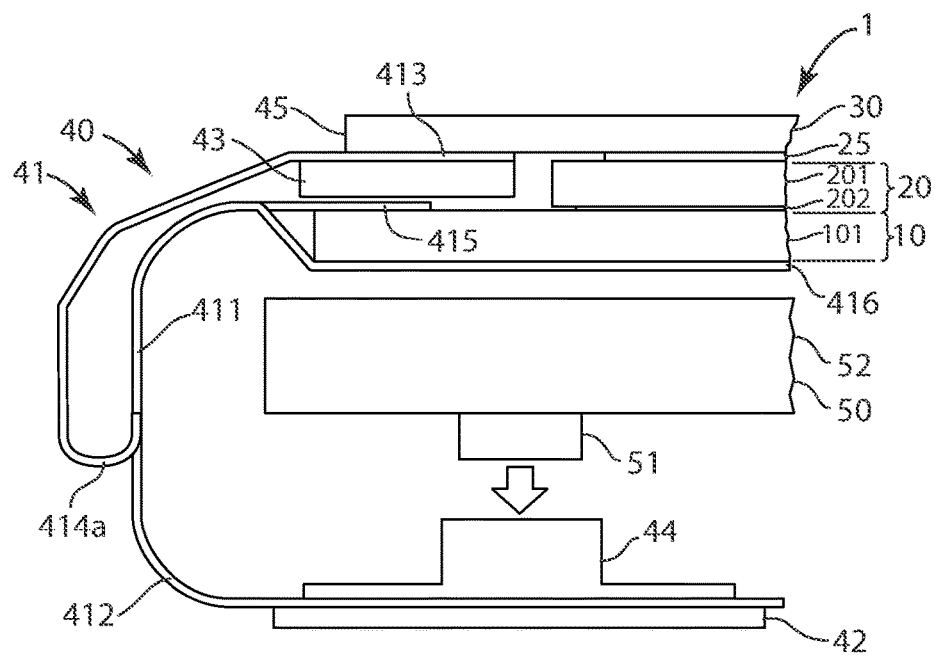
FIG. 1 is a side view of an electrophoretic display device to which a display device according to an embodiment of the invention is applied.
Figure 2:
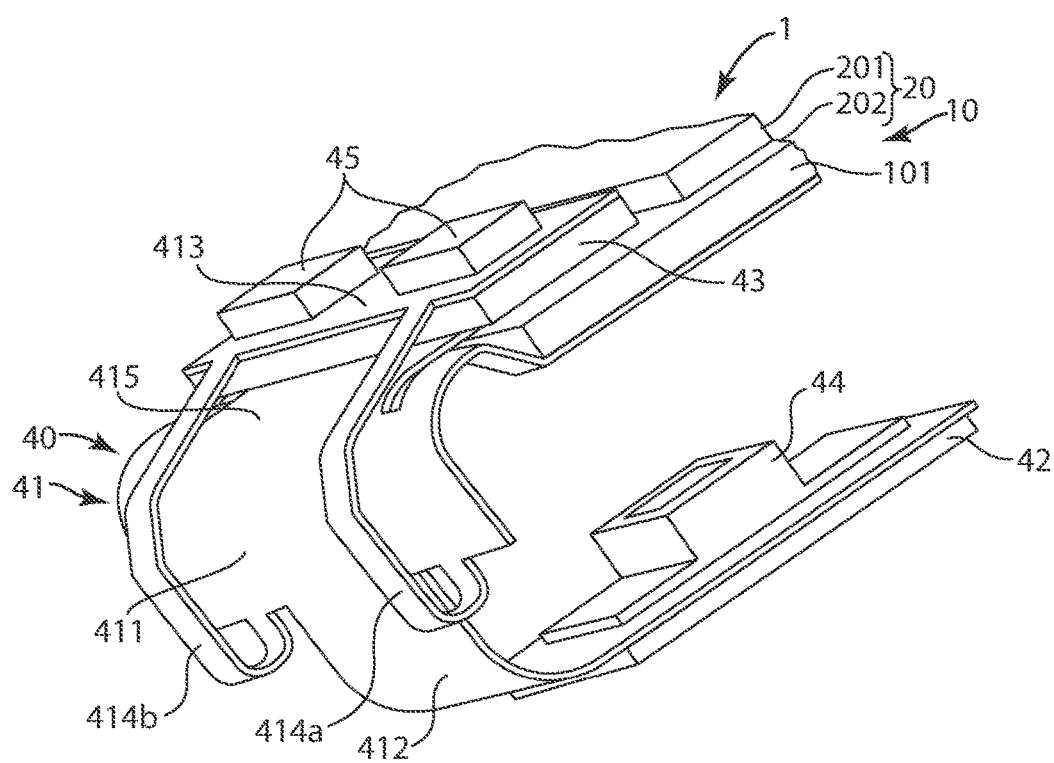
FIG. 2 is a perspective view of the electrophoretic display device illustrated in FIG. 1.

FIG. 1 is a side view of an electrophoretic display device to which a display device according to an embodiment of the invention is applied and FIG. 2 is a perspective view of the electrophoretic display device illustrated in FIG. 1. In the following description, the upper side in FIG. 1 will be described as "upper" and the lower side as "lower" for convenience of explanation. Also, in FIG. 2, some (light guide plate, control board, and the like) of the portions illustrated in FIG. 1 are omitted.

An electrophoretic display device 1 illustrated in FIG. 1 is a display device that displays a desired image by utilizing particle migration, and is specifically a device employing a front light system.

The electrophoretic display device 1 illustrated in FIG. 1 includes a backplane 10 including a pixel electrode substrate 101 and an active matrix circuit (pixel circuit) (not illustrated), and a front plane 20 including a counter substrate 201, an electrophoretic material layer 202, and a common electrode (not illustrated).

Moreover, the electrophoretic display device 1 (display device) illustrated in FIG. 1 includes a light guide plate 30, a display device circuit board 40, and a control board 50. The lower surface of the light guide plate 30 and the upper surface of the front plane 20 are adhered to each other via an adhesive layer 25. In the electrophoretic display device 1 illustrated in FIG. 1, the upper surface of the light guide plate 30 serves as a display surface.

The display device circuit board 40 includes a flexible substrate 41, a connector reinforcing plate 42 and a light emitter reinforcing plate 43 provided on one main surface of the flexible substrate 41, and a connector 44 and light emitters 45 provided on the other main surface of the flexible substrate 41.

The display device circuit board 40 is housed in a casing (not illustrated) of the electrophoretic display device 1 by bending a portion of the flexible substrate 41.

Moreover, the control board 50 is provided with a connector 51 on the lower surface thereof. The control board 50 and the display device circuit board 40 are electrically connected to each other by fitting the connector 51 and the connector 44 of the display device circuit board 40 to each other as illustrated by the arrow in FIG. 1.

Hereinafter, each component of the electrophoretic display device 1 will be described in detail.

The backplane 10 includes the pixel electrode substrate 101.

As the constituent material of the pixel electrode substrate 101, for example, any of various resin materials, various glass materials and the like may be used.

Further, a pixel electrode, an external terminal, a thin film transistor (TFT) element, an electronic component, and the like (not illustrated) are provided on the pixel electrode substrate 101. These components are electrically connected by a wiring pattern.

In contrast, the front plane 20 includes the counter substrate 201.

As the constituent material of the counter substrate 201, for example, any of various resin materials, various kinds of glass materials and the like can be used, but in particular, a material having a light-transmitting property is used. Consequently, it is possible to set the upper surface of the light guide plate 30 as the display surface.

Further, a common electrode, an external terminal, and the like (not illustrated) are provided on the counter substrate 201. These components are electrically connected by a wiring pattern.

The light guide plate 30 includes a light guide pattern and guides the light emitted from the light emitters 45 toward the electrophoretic material layer 202. As a result, the electrophoretic material layer 202 is illuminated, and the display content in the electrophoretic material layer 202 can be visually recognized even in a dark place.

As the constituent material of the light guide plate 30, for example, a light-transmitting material is used.

The control board 50 includes a base portion 52 and the connector 51, which is provided on the lower surface of the base portion 52.

As the constituent material of the base portion 52, for example, any of various insulating materials can be used.

Moreover, in addition to the connector 51, electronic components (not illustrated) and the like are mounted on the base portion 52. Examples of the electronic components include a control element including a timekeeping circuit such as an oscillation circuit or a frequency dividing circuit, active elements such as various operation elements (central processing unit (CPU), large-scale integration (LSI), and the like) and passive elements such as resistors, capacitors, diodes and coils.

The adhesive layer 25 adheres the lower surface of the light guide plate 30 to the upper surface of the front plane 20.

The adhesive constituting the adhesive layer 25 is not particularly limited, and adhesives resulting in a cured product having a light-transmitting property may be suitably selected and used.

Further, the electrophoretic display device 1 may have an arbitrary structure besides these.

Specifically, the electrophoretic display device 1 may include a housing, a solar cell, a primary battery, a secondary battery, operation buttons, an antenna, a sensor element, a motor, and the like.

The display device circuit board 40 includes the flexible substrate 41, which is in the form of a single sheet, and various structural bodies provided on one main surface and the other main surface of the flexible substrate 41. Then, as illustrated in FIGS. 1 and 2, the display device circuit board 40 is bent by making use of the flexibility of the flexible substrate 41.

Display Device Circuit Board

Next, each component of the display device circuit board 40 will be described in detail.

Figure 3:
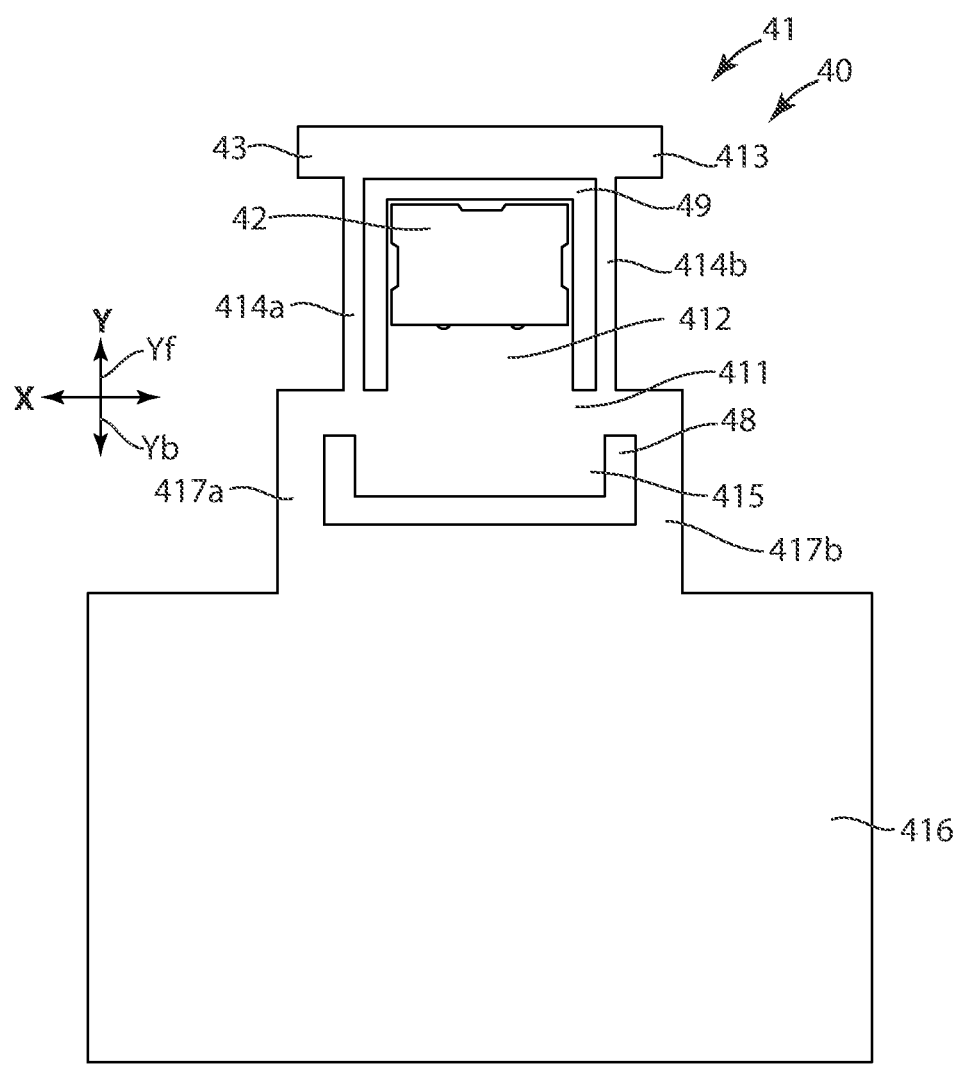
FIG. 3 is a plan view illustrating a state in which a display device circuit board that was bent as illustrated in FIGS. 1 and 2 is laid flat, and illustrates one main surface of a flexible substrate.
Figure 4:
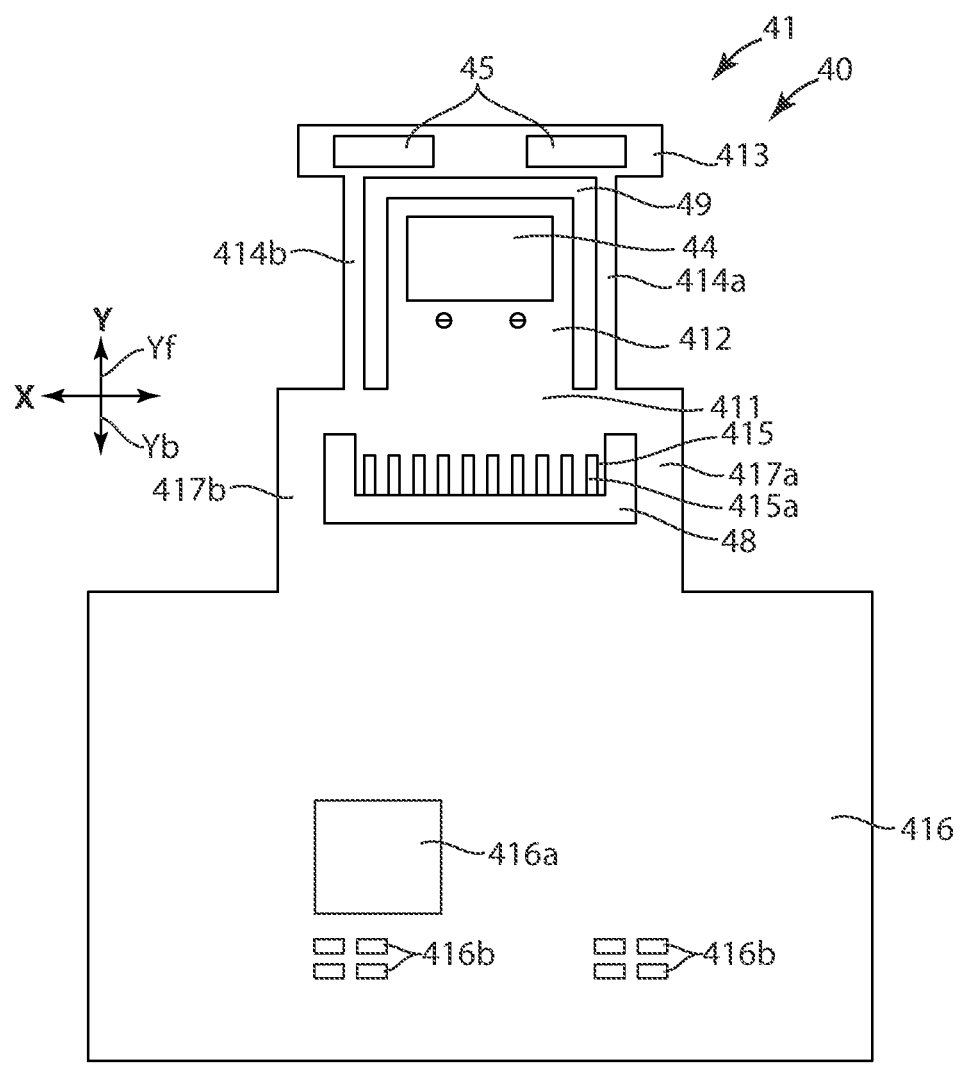
FIG. 4 is a plan view illustrating a state in which the display device circuit board that was bent as illustrated in FIGS. 1 and 2 is laid flat, and illustrates the other main surface of the flexible substrate.

FIG. 3 is a plan view illustrating a state in which the display device circuit board 40 that was bent as illustrated in FIGS. 1 and 2 is laid flat, and illustrates the one main surface of the flexible substrate 41. Moreover, FIG. 4 is a plan view illustrating a state in which the display device circuit board 40 that was bent as illustrated in FIGS. 1 and 2 is laid flat, and illustrates the other main surface of the flexible substrate 41. Further, FIG. 5 is a plan view illustrating only the flexible substrate 41 of FIG. 3.

Figure 5:
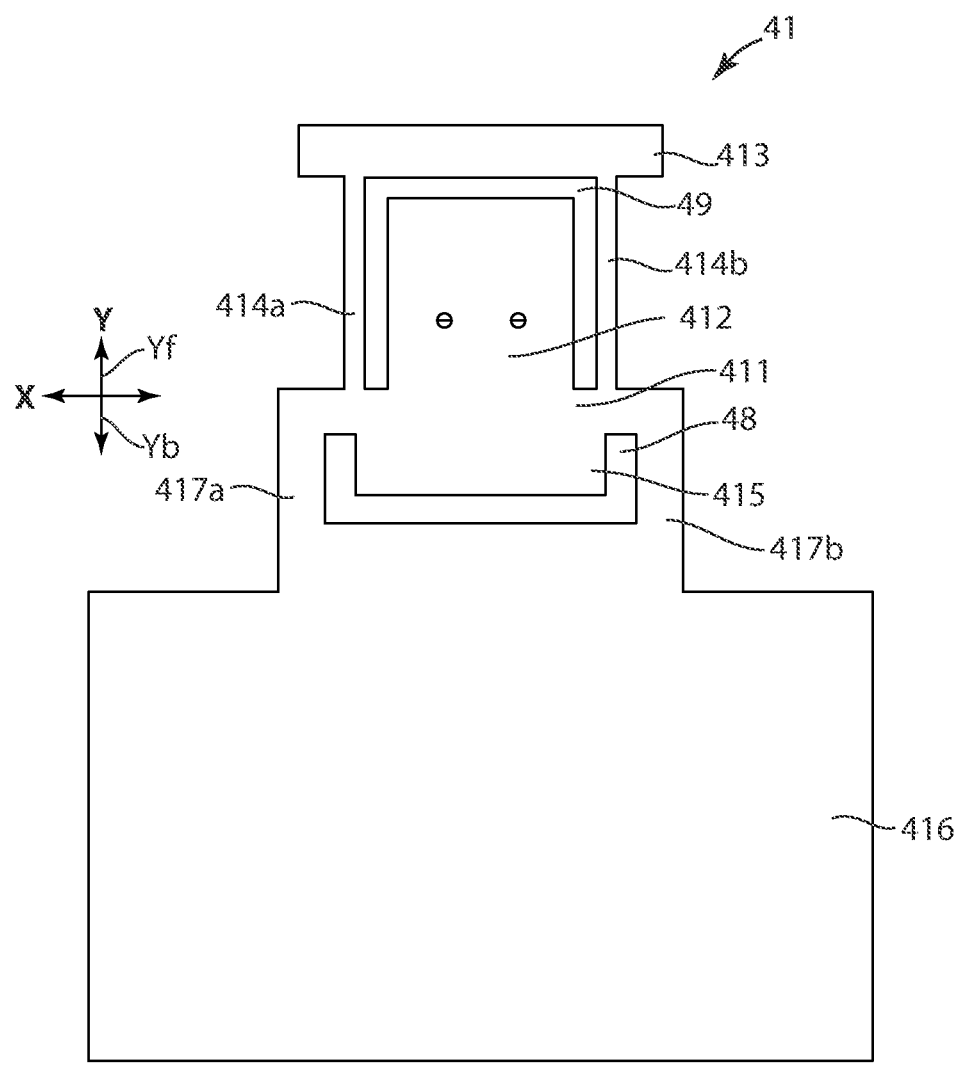
FIG. 5 is a plan view illustrating only the flexible substrate of FIG. 3.

In this specification, the vertical direction in FIGS. 3 to 5 is defined as the Y direction (a first direction) and the horizontal direction is defined as the X direction (a second direction intersecting the first direction). Further, in the Y direction, the direction from the lower side to the upper side in FIGS. 3 to 5 is defined as "forward Yf" and the direction from the upper side to the lower side in FIGS. 3 to 5 is defined as "backward Yb".

Flexible Substrate

The display device circuit board 40 includes the flexible substrate 41.

The flexible substrate 41 is a flexible sheet (substrate), for example, a flexible printed circuit (FPC) substrate or the like. A wiring pattern (not illustrated) is formed in the interior of the flexible substrate 41 and on the surface of the flexible substrate 41, and terminals are provided on the surface of the flexible substrate 41. Components can be electrically connected via the flexible substrate 41.

In addition, as illustrated in FIGS. 3 to 5, the flexible substrate 41 includes a base portion 411, a connector mounting portion 412 protruding forward Yf in the Y direction (the first direction) from the base portion 411, and a light emitter mounting portion 413 provided forward Yf in the Y direction more than the connector mounting portion 412, and an arm portion 414a and an arm portion 414b that protrude from the base portion 411 forward Yf in the Y direction and that connect the base portion 411 and the light emitter mounting portion 413 to each other. These portions may be joined together, but it is preferable that the entirety of the flexible substrate 41 be integrally formed.

The color of the flexible substrate 41 is not particularly limited, but it is particularly preferable that it be a dark color such as black. Consequently, the light absorption rate of the flexible substrate 41 is increased, so even when, for example, stray light strikes the flexible substrate 41, irregular reflection is suppressed. As a result, degradation of the display quality of the electrophoretic display device 1 due to reflected light can be suppressed.

The display device circuit board 40 includes the connector reinforcing plate 42 provided on one main surface of the connector mounting portion 412 and the connector 44 provided on the other main surface of the connector mounting portion 412.

In the flexible substrate 41, a gap 49 is interposed between the light emitter mounting portion 413 and the connector mounting portion 412 and between the arm portions 414a and 414b and the connector mounting portion 412.

Further, the display device circuit board 40 includes the connector mounting portion 412 that enables electrical connection of the display device circuit board 40 with the control board 50 and the light emitter mounting portion 413 on which the light emitters 45 are mounted. The connector mounting portion 412 is provided with the connector 44 through which electric connection with the control board 50 is achieved. Moreover, the light emitters 45 are mounted on the light emitter mounting portion 413.

The control board 50 and the light emitters 45 are often provided at different levels in the electrophoretic display device 1. In the electrophoretic display device 1 illustrated in FIG. 1, the control board 50 is arranged below the backplane 10, and the light emitters 45 are arranged above the backplane 10. Consequently, to date, in order to electrically connect these components, there has been a problem in that the degree of difficulty of wiring routing has been high. In particular, in the case where the electrophoretic display device 1 is compact, high accuracy is required for the position of the wiring. In addition, in the case where the electrophoretic display device 1 is compact, it is also necessary to save wiring space, so it is necessary to shorten the wiring length as much as possible and to squeeze the wiring into a narrow gap. Consequently, there have been problems of complication of assembly work and high cost.

In view of such problems, the present inventors have conducted extensive studies on the structure of the display device circuit board 40. By interposing the gap 49 between the light emitter mounting portion 413 and the connector mounting portion 412, and between the arm portions 414a and 414b connecting the base portion 411 and the light emitter mounting portion 413 and the connector mounting portion 412, it was found that the above-mentioned problems could be solved, and the invention was completed.

That is, the display device circuit board 40 includes the flexible substrate 41 that includes the base portion 411, the connector mounting portion 412 protruding forward Yf in the Y direction (the first direction) from the base portion 411, the light emitter mounting portion 413 provided forward Yf in the Y direction more than the connector mounting portion 412, and the arm portion 414a and the arm portion 414b that protrude from the base portion 411 forward Yf in the Y direction and that connect the base portion 411 and the light emitter mounting portion 413 to each other, and the connector reinforcing plate 42 provided on the one main surface of the connector mounting portion 412, and the gap 49 is interposed between the light emitter mounting portion 413 and the connector mounting portion 412 and between the arm portions 414a and 414b and the connector mounting portion 412.

By providing the gap 49 such as that described above, the connector mounting portion 412 and the light emitter mounting portion 413 can be bent in mutually different directions. That is, when the base portion 411 is used as a reference, the connector mounting portion 412 can be bent toward the other main surface side of the base portion 411 while the light emitter mounting portion 413 can be bent toward one main surface side of the base portion 411. Accordingly, the connector mounting portion 412 and the light emitter mounting portion 413 can extend in different directions with respect to the base portion 411.

Specifically, the connector mounting portion 412 extends downward from the base portion 411 in FIG. 1 and is slightly bent toward the other main surface side of the base portion 411. As a result, the other main surface of the connector mounting portion 412 faces the lower surface of the backplane 10.

However, although the light emitter mounting portion 413 initially projects downward from the base portion 411 in FIG. 1, thereafter, the light emitter mounting portion 413 is routed upward by changing the direction by 180°, and is further slightly bent to the other main surface side of the base portion 411. Consequently, the one main surface of the light emitter mounting portion 413 faces the upper surface of the backplane 10.

That is, the other main surface of the connector mounting portion 412 faces the one main surface of the light emitter mounting portion 413. Consequently, when the connector 44 is disposed on the one main surface of the connector mounting portion 412, the control board 50 can naturally be easily inserted between the connector mounting portion 412 and the pixel circuit (the backplane 10).

In addition, because the light emitter reinforcing plate 43 can be disposed on the other main surface of the light emitter mounting portion 413, when the light emitters 45 are disposed on the one main surface of the light emitter mounting portion 413, alignment of the light guide plate 30 and the light emitters 45 is facilitated in the electrophoretic display device 1.

Further, note that the other main surface of the connector mounting portion 412 faces the one main surface of the light emitter mounting portion 413 means that the main surfaces are substantially parallel to each other, that is, the angle formed by the planes each including the main surface is in the range of 0° or more and 10° or less.

As described above, in the display device circuit board 40, it is possible to easily route the wiring to different layers in the electrophoretic display device 1. That is, even if the connector mounting portion 412 is routed to the lower side of the backplane 10, the light emitter mounting portion 413 can be easily routed in the opposite direction, that is, toward the upper side of the backplane 10.

Further, since the wiring can be routed by merely bending the flexible substrate 41 as one sheet, the assembly operation can be easily and accurately performed even in the case of the display device circuit board 40, which is compact. Therefore, even if a worker is not experienced, it is possible to shorten the assembly work time, reduce the cost, and reduce the environmental load.

In addition, the position that the wiring included in the flexible substrate 41 reaches can be easily controlled (highly accurately) as designed. Therefore, it is possible to realize compactness of the display device circuit board 40 and high accuracy of mounting work. In addition, without reducing the elastic force of the wiring, an unintentional load can be suppressed from being applied to the connection destination, namely, the control board 50, the position of the light emitters 45 can be controlled and the reliability of the electrophoretic display device 1 can be increased.

Therefore, according to the invention, the electrophoretic display device 1 with high reliability can be obtained even in a small size.

Furthermore, since the extra length of the wiring length necessary for routing the wiring can be reduced to a minimum, the wiring provided on the flexible substrate 41 can be set to substantially the shortest length. As a result, space saving can be achieved, and advantages such as suppressing delay and noise generation of signals transmitted through wiring and reducing power consumption can be obtained.

Although the width (the length in the X direction) of each of the arm portions 414a and 414b is not particularly limited, it is preferable to make the width narrower than the width of the connector mounting portion 412. Consequently, the arm portions 414a and 414b can be bent relatively easily. Therefore, as illustrated in FIGS. 1 and 2, for example, even if one of the main surfaces of the arm portions 414a and 414b is bent (at a bending angle of 180°), the restoring force generated can be suppressed to a small level. As a result, as described above, the work of bending the connector mounting portion 412 and the light emitter mounting portion 413 in different directions can be performed more easily.

Further, by arranging the arm portions 414a and 414b so as to be bent at a bending angle of 180°, it is possible to perform three-dimensional wiring even with the flexible substrate 41, which is like a single sheet. In other words, when the flexible substrate 41 is laid flat, the connector mounting portion 412 and the light emitter mounting portion 413, which extend toward different layers in the electrophoretic display device 1, are provided at different positions in the Y direction (the light emitter mounting portion 413 is provided forward Yf of the connector mounting portion 412), so that it is possible to easily manufacture the flexible substrate 41 including these portions by cutting out the flexible substrate 41 from one sheet. Therefore, cost reduction of the display device circuit board 40 can be achieved.

Further, even though terminals for electrically connecting the wiring of the flexible substrate 41 and the connector 44 are exposed at the connector mounting portion 412 and the terminals for electrical connection of the wiring of the flexible substrate 41 and the light emitters 45 to the light emitter mounting portion 413 are exposed, these are not illustrated.

Further, in this embodiment, two arm portions such as the arm portions 414a and 414b are provided. The arm portions 414a and 414b are positioned on either side of the connector mounting portion 412 in the X direction (the second direction crossing the first direction). That is, the connector mounting portion 412 is positioned between the two arm portions 414a and 414b. Consequently, the shape of the flexible substrate 41 can easily be made bilaterally symmetrical, so that, when the connector mounting portion 412 and the arm portions 414a and 414b are bent as illustrated in FIGS. 1 and 2, for example, it is difficult for twisting to occur. As a result, it is possible to more accurately route the connector mounting portion 412 and the light emitter mounting portion 413 toward the intended position, and it is possible to improve the reliability and ease of assembly of the electrophoretic display device 1.

Further, the number of arm portions is not limited to two, and may be three or more.

Further, the flexible substrate 41 according to this embodiment includes, in addition to the base portion 411, the connector mounting portion 412, the light emitter mounting portion 413, and the arm portions 414a and 414b, a pixel circuit connection portion 415 that protrudes from the base portion 411 backward Yb in the Y direction, a support portion 416 located further backward Yb than the pixel circuit connection portion 415 in the Y direction, and an arm portion 417a and an arm portion 417b projecting from the base portion 411 backward Yb in the Y direction and connecting the base portion 411 and the support portion 416 to each other.

Further, the display device circuit board 40 includes terminals 415a provided on the other main surface of the pixel circuit connection portion 415.

In the flexible substrate 41, a gap 48 is interposed between the support portion 416 and the pixel circuit connection portion 415, and between the arm portions 417a and 417b and the pixel circuit connection portion 415.

When the display device circuit board 40 of such a type is assembled as illustrated in FIGS. 1 and 2, the pixel circuit connection portion 415 is routed to the upper surface of the backplane 10. The display device circuit board 40 and the active matrix circuit (pixel circuit) of the backplane 10 and the front plane 20 are electrically connected to each other by electrically connecting the terminals 415a to the terminals exposed at the upper surface of the backplane 10. Consequently, it is possible to drive the active matrix circuit and apply a voltage to the electrophoretic material layer 202. In the electrophoretic material layer 202, electrophoresis of the electrophoretic particles can be controlled for each pixel, and an arbitrary image can be displayed. For display, for example, the electrophoretic particles are moved for each pixel, and the target image is displayed by making the reflectance of light guided from the light guide plate 30 different for each pixel.

In addition, because the gap 48 is provided, the support portion 416 can be easily routed toward a layer different from the pixel circuit connection portion 415. The support portion 416 is arranged along the lower surface of the backplane 10 and supported thereon. Thereby, the display device circuit board 40 can be easily and stably fixed. Further, since the wiring can be routed by merely folding the flexible substrate 41 as one sheet, workers with low proficiency can easily and accurately perform the assembly work.

Furthermore, since the extra length of the wiring length necessary for routing the wiring can be reduced to a minimum, the wiring provided on the flexible substrate 41 can be set to substantially the shortest length. As a result, space saving can be achieved, and advantages such as suppressing the delay and the influence of noise of signals transmitted through the wiring and reducing power consumption can be obtained.

In addition, the arm portions 417a and 417b are positioned on either side of the pixel circuit connection portion 415 in the X direction. That is, the pixel circuit connection portion 415 is positioned between the two arm portions 417a and 417b. Consequently, the shape of the flexible substrate 41 can easily be made bilaterally symmetrical, so that, when the support portion 416 is bent as illustrated in FIGS. 1 and 2, for example, it is difficult for twisting to occur. As a result, the pixel circuit connection portion 415 and the support portion 416 can be routed more accurately toward the intended position, and the reliability and ease of assembly of the electrophoretic display device 1 can be improved.

The pixel circuit connection portion 415 and the backplane 10 are connected to each other via, for example, a conductive sheet, a bonding wire, or the like. Examples of the conductive sheet include an anisotropic conductive film and an anisotropic conductive paste. Moreover, the pixel circuit connection portion 415 and the backplane 10 may be connected via a different wiring material.

Further, the pixel circuit connection portion 415 should be provided as needed and may be omitted in the case where, for example, terminals are established in the base portion 411.

Further, as illustrated in FIG. 4, an active element 416a and passive elements 416b may be provided on the other main surface of the support portion 416 according to this embodiment. Examples of the active element 416a include a driving element (driver IC) of the backplane 10 and the front plane 20. By providing the driving element on the support portion 416 in this manner, the driving element may be arranged at a position close to the backplane 10 and the front plane 20. Therefore, the wiring length can be suppressed to a minimum, and it is possible to suppress the influence of signal delay and noise. Moreover, the active element 416a and the passive elements 416b may be provided if necessary or may be omitted.

Further, the shape of the flexible substrate 41 is not limited to the illustrated shape. For example, although the base portion 411 illustrated in FIGS. 3 and 5 is elongated in the X direction, it may be elongated in the Y direction, or may have the same lengths in the X direction and the Y direction. Moreover, although the width (the length in the X direction) of each of the connector mounting portion 412 and the arm portions 414a and 414b illustrated in FIGS. 3 and 5 is substantially constant, the shape may be a shape having a width that changes. Moreover, even though the light emitter mounting portion 413 illustrated in FIGS. 3 and 5 is elongated in the X direction, it may be elongated in the Y direction, or may have the same lengths in the X direction and the Y direction.

Furthermore, the support portion 416 illustrated in FIGS. 3 and 5 is longer in the X direction than the base portion 411, but may be shorter than the base portion 411. In addition, although the shape of the support portion 416 illustrated in FIGS. 3 and 5 is substantially rectangular, it may have another shape, for example, a circular shape such as a perfect circle, an ellipse, or an ovoid, a polygonal shape such as a hexagon or an octagon, or an irregular shape.

Moreover, the flexible substrate 41 may include components other than those stated above.

Connector Reinforcing Plate

The display device circuit board 40 includes the connector reinforcing plate 42 provided on the one main surface of the connector mounting portion 412.

The constituent material of the connector reinforcing plate 42 is not particularly limited, and examples thereof include various resin materials such as a polyimide resin, a polyamide resin, an epoxy resin, various vinyl resins, and a polyester resin such as a polyethylene terephthalate resin. In addition, an organic rigid substrate such as paper, glass fabric, resin film or the like that is used as a substrate and that is impregnated with a resin material such as a phenol resin, a polyester resin, an epoxy resin, a cyanate resin, a polyimide resin or a fluorine resin, or an inorganic rigid substrate such as an alumina substrate, an aluminum nitride substrate, a silicon carbide substrate, or the like may be used.

The display device circuit board 40 also has the connector 44 provided on the other main surface of the connector reinforcing plate 42. Consequently, the display device circuit board 40 and the control board 50 can be electrically connected via the connector 44. Accordingly, for example, it is possible to drive the active matrix circuit or apply a voltage to the light emitters 45 on the basis of an instruction from an operation element or the like provided on the control board 50.

By providing the connector reinforcing plate 42, when the connector 44 is arranged on the other main surface of the connector mounting portion 412 and the control board 50 is further connected via the connector 44, the connection operability thereof can be improved. That is, when the connector reinforcing plate 42 is not provided, the fitting operability of the connector 44 and the connector 51 is markedly deteriorated. On the other hand, by providing the connector reinforcing plate 42, it is possible to easily perform the fitting work by pressing the connector reinforcing plate 42, so that the connection operability can be improved.

It should be noted that the connector mounting portion 412 of the flexible substrate 41 is a portion protruding from the base portion 411 as described above and forms a so-called "peninsular shape". Therefore, the edges of three sides of the connector mounting portion 412 other than the base portion 411 side edge of the connector mounting portion 412 are free ends, and are shaped so as to be easily grasped by an operator. Therefore, the assembly worker can work without grasping the display surface or the like during the operation of fitting the connector 44 and the connector 51 or releasing the connector 44 from the connector 51. Consequently, the likelihood of the display surface being inadvertently touched can be reduced, and from this viewpoint, it can be said that the display device circuit board 40 has high connection operability with the control board 50.

Further, the connector 44 is not particularly limited as long as it can electrically and mechanically connect the flexible substrate 41 and the control board 50 to each other.

Light Emitter Reinforcing Plate

The display device circuit board 40 includes the light emitter reinforcing plate 43 provided on the one main surface of the light emitter mounting portion 413.

The constituent material of the light emitter reinforcing plate 43 is not particularly limited, but is appropriately selected from among materials that are substantially the same as the constituent material of the connector reinforcing plate 42 described above.

By providing the light emitter reinforcing plate 43, operability when arranging the light emitters 45 on the other main surface of the light emitter mounting portion 413 is improved. As illustrated in FIG. 1, the light emitter reinforcing plate 43 is also used for supporting the light guide plate 30. Consequently, it is possible to arrange the light emitters 45 and the light guide plate 30 more accurately.

Further, the display device circuit board 40 has the light emitters 45 provided on the other main surface of the light emitter mounting portion 413. As a result, because the light emitters 45 and the display device circuit board 40 can be electrically connected to each other, it is possible to apply a voltage to the light emitters 45, for example, via the display device circuit board 40.

The light emitters 45 are not particularly limited as long as they can emit light toward the light guide plate 30; for example, a light emitting diode (LED), a cold cathode tube, or the like can be used. In this embodiment, two light emitters 45 are mounted on the light emitter mounting portion 413.

Modification Example of Display Device Circuit Board

Next, a modification example of the display device circuit board 40 will be described in detail.

Figure 6:
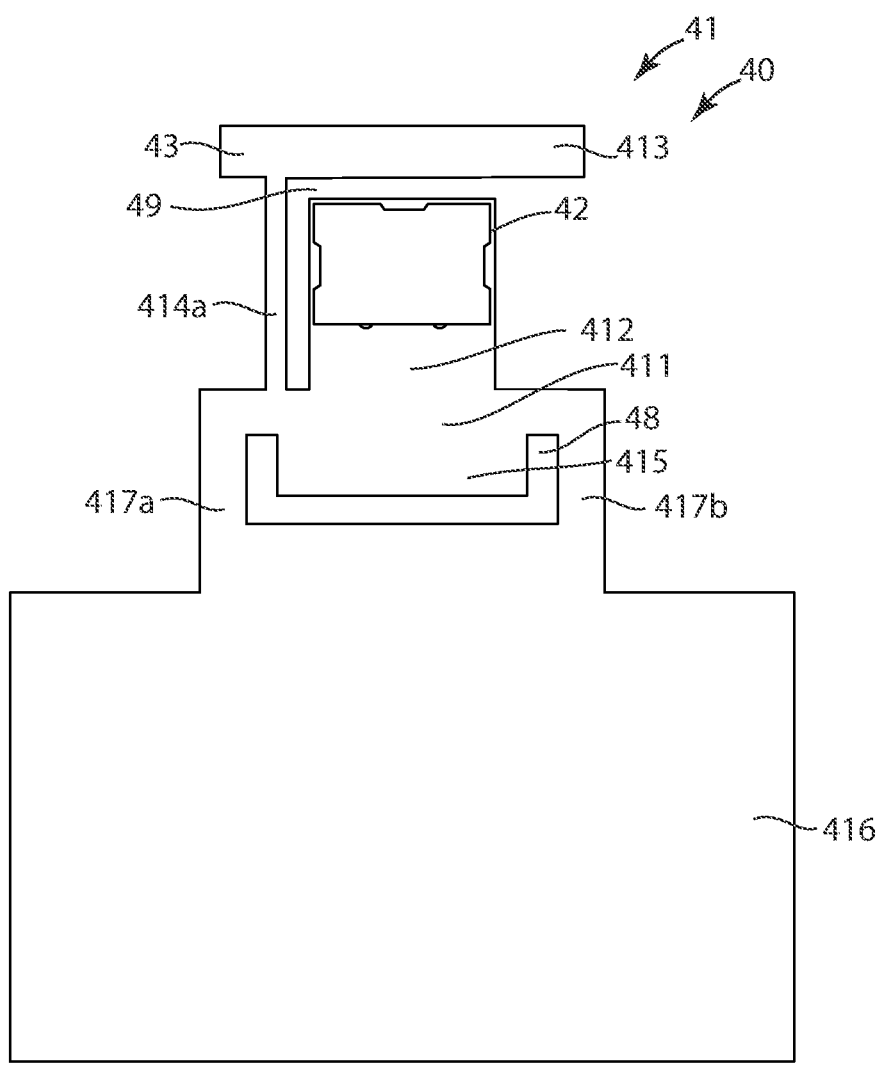
FIG. 6 is a plan view of a modification example of the display device circuit board illustrated in FIG. 3.

FIG. 6 is a plan view of a modification example of the display device circuit board 40 illustrated in FIG. 3.

Hereinafter, a modification example will be described. In the following description, differences from the display device circuit board 40 illustrated in FIG. 3 will be mainly described, and description of similar points will be omitted.

This modification example is similar to the display device circuit board 40 illustrated in FIG. 3, except that the arm portion 414b is omitted from among the two arm portions 414a and 414b.

That is, in the display device circuit board 40 illustrated in FIG. 3, the light emitter mounting portion 413 is connected to the base portion 411 via the two arm portions 414a and 414b, whereas in this modification, it is connected to the base portion 411 with only one arm portion 414a (refer to FIG. 6).

In such a modification example, the same effect as that of the display device circuit board 40 illustrated in FIG. 3 can be obtained.

Method of Manufacturing Display Device Circuit Board

Next, a method of manufacturing the display device circuit board 40 will be described.

The display device circuit board 40 includes a step of cutting out the flexible substrate 41 from an FPC sheet, a step of affixing the connector reinforcing plate 42 to the connector mounting portion 412 and attaching the light emitter reinforcing plate 43 to the light emitter mounting portion 413, and a step of mounting the connector 44, the light emitters 45, the active element 416a, the passive elements 416b, and the like. Hereinafter, each of these steps will be described in order.

[1] First, a desired shape is cut out from an FPC sheet on which wirings, terminals and the like are formed to obtain the flexible substrate 41.

For cutting out portions, for example, machining such as mechanical cutting and punching, laser processing, or the like is used.

[2] Next, the connector reinforcing plate 42 is adhered to the connector mounting portion 412, and the light emitter reinforcing plate 43 is adhered to the light emitter mounting portion 413.

For this attachment, for example, an adhesive, an adhesive sheet, or the like is used. Among these, particularly high positioning accuracy is required for adhering the connector reinforcing plate 42. The connector mounting portion 412 and the connector reinforcing plate 42 according to the present embodiment may have features for enhancing the positioning accuracy. These features will be described below.

Figure 7:
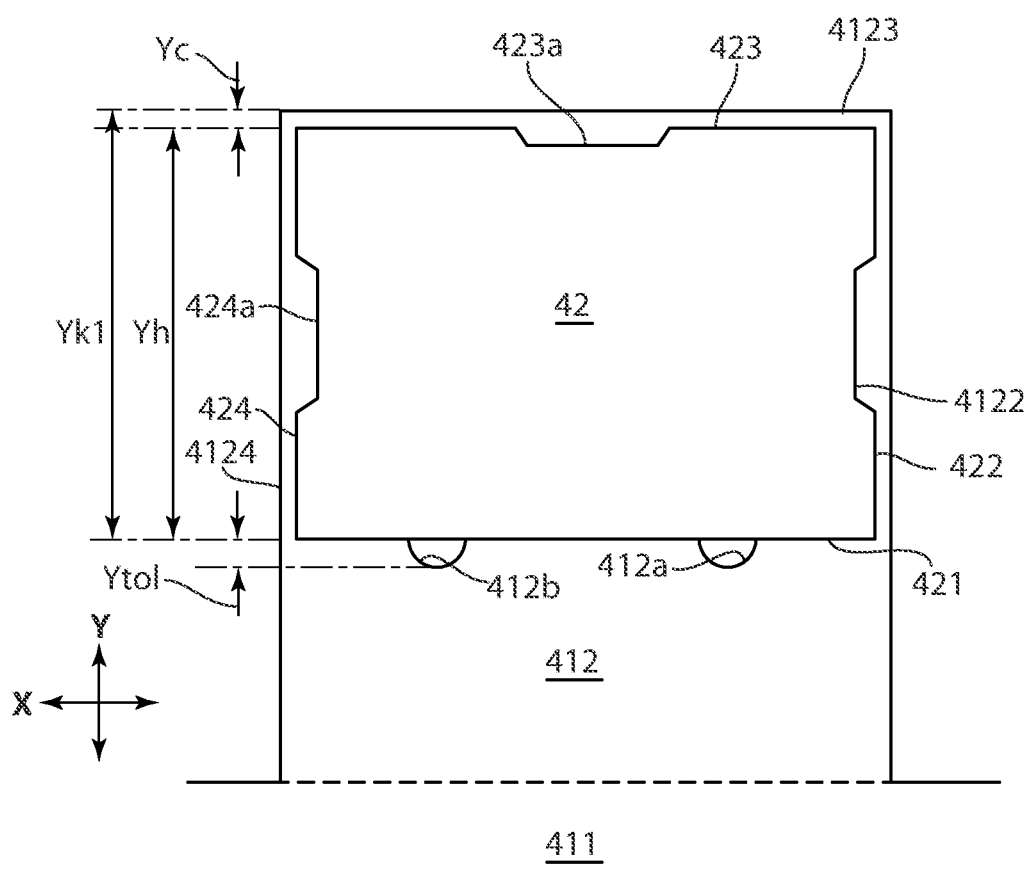
FIG. 7 is an enlarged view of a portion of the display device circuit board illustrated in FIG. 3.
Figure 8:
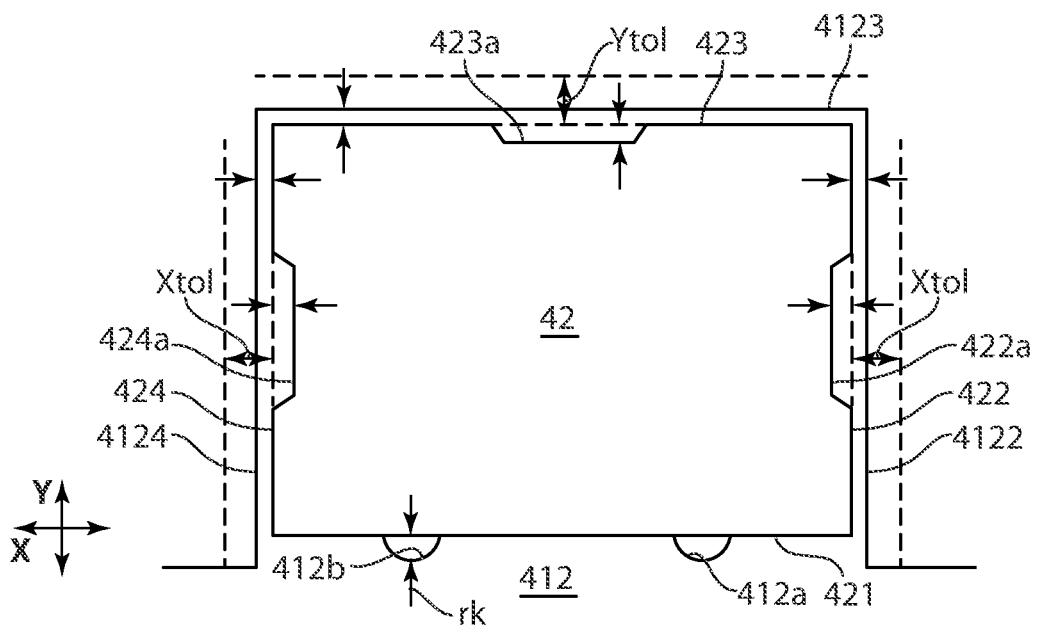
FIG. 8 is an enlarged view of FIG. 7.

FIG. 7 is an enlarged view of a portion of the display device circuit board 40 illustrated in FIG. 3 and FIG. 8 is an enlarged view of FIG. 7. In the following description, for the sake of convenience of explanation, the upper side in FIGS. 7 and 8 is referred to as "upper", the lower side is referred to as "lower", the right side as "right" and the left side as "left"

The connector reinforcing plate 42 illustrated in FIGS. 7 and 8 is substantially rectangular. The connector reinforcing plate 42 has cutouts (formed in the outer edge) on a right side 422, an upper side 423, and a left side 424 of the four sides excluding a lower side 421 on the base portion 411 side.

That is, on the right side 422 of the connector reinforcing plate 42, a right side cutout 422a is formed near the center of the length thereof. An upper side cutout 423a is formed near the center of the length of the upper side 423, and a left side cutout 424a is formed on the left side 424 near the center of the length thereof. The right side cutout 422a, the upper side cutout 423a, and the left side cutout 424a have a function of improving the alignment accuracy when the connector reinforcing plate 42 is adhered to the connector mounting portion 412, as will be described in detail later.

Although the right side cutout 422a, the upper side cutout 423a and the left side cutout 424a each have a trapezoidal shape, this shape is not particularly limited, and any shape such as a rectangle, a square, a polygon, a circle, or the like may be used.

Further, the three sides of the connector mounting portion 412 illustrated in FIGS. 7 and 8 are a right side 4122, an upper side 4123, and a left side 4124.

However, the connector mounting portion 412 illustrated in FIGS. 7 and 8 has two openings 412a and 412b. The openings 412a and 412b are provided at positions overlapping the lower side 421 of the connector reinforcing plate 42 in terms of design. The openings 412a and 412b also have a function of improving the positioning accuracy when the connector reinforcing plate 42 is adhered to the connector mounting portion 412, which will be described in detail later.

The openings 412a and 412b are each in the shape of a perfect circle as illustrated in FIG. 5, but this shape is not particularly limited, and the shape may be any shape such as a polygon such as a rectangle, a square, a diamond, or a triangle, or an ovoid, an ellipse, or the like.

Here, the dimensional tolerance Ytol of the upper positional deviation when the connector reinforcing plate 42 is adhered is restricted on the basis of the allowable amount of positional deviation with respect to the connector 44. That is, if the positional deviation of the connector reinforcing plate 42 becomes excessively large, because the function of reinforcing the portion to which the connector 44 is attached is lost, the dimensional tolerance Ytol of the upper positional deviation is restricted on the basis of the range over which such a function is secured. Moreover, the dimensional tolerance Ytol is also affected by the storage space and the like of the display device circuit board 40.

The connector reinforcing plate 42 in FIG. 8, as an example, is illustrated as being adhered to the connector mounting portion 412 as designed. Consequently, the dimensional tolerance Ytol of the upper positional deviation of the connector reinforcing plate 42 is set upward from the upper side 423 in FIG. 8.

The design distance between the upper side 4123 of the connector mounting portion 412 and the upper side 423 of the connector reinforcing plate 42 is defined as a clearance Yc.

At this time, the design value of the depth Yk of the upper side cutout 423a formed in the connector reinforcing plate 42 is obtained as the difference (Ytol−Yc) between the dimensional tolerance Ytol and the clearance Yc. Therefore, by providing the upper side cutout 423a having the depth Yk, the connector reinforcing plate 42 is provided with a function of improving the positioning accuracy at least on the upper side.

Next, the operation of the upper side cutout 423a will be described.

FIGS. 9 to 12 are each a view for explaining an operation of adhering the connector reinforcing plate 42 to the connector mounting portion 412 when manufacturing the display device circuit board 40 illustrated in FIG. 3. In FIGS. 9 to 12, dots denote the connector reinforcing plate 42.

Figure 9:
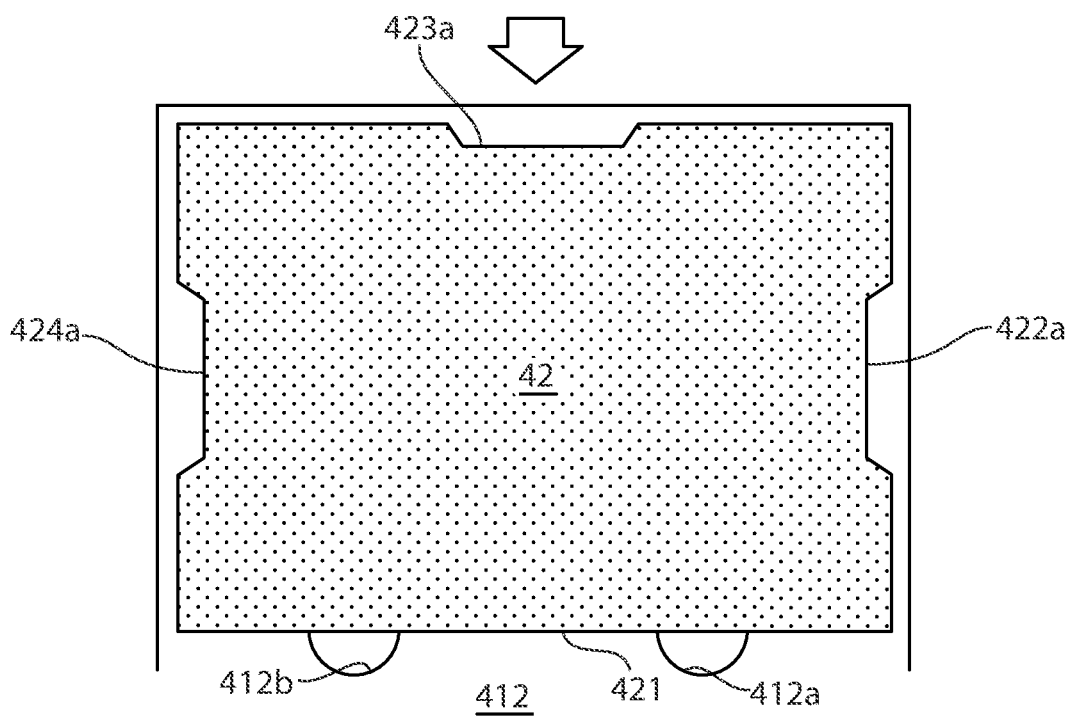
FIG. 9 is a view for explaining an operation of attaching a connector reinforcing plate to a connector mounting portion when manufacturing the display device circuit board illustrated in FIG. 3.
Figure 10:
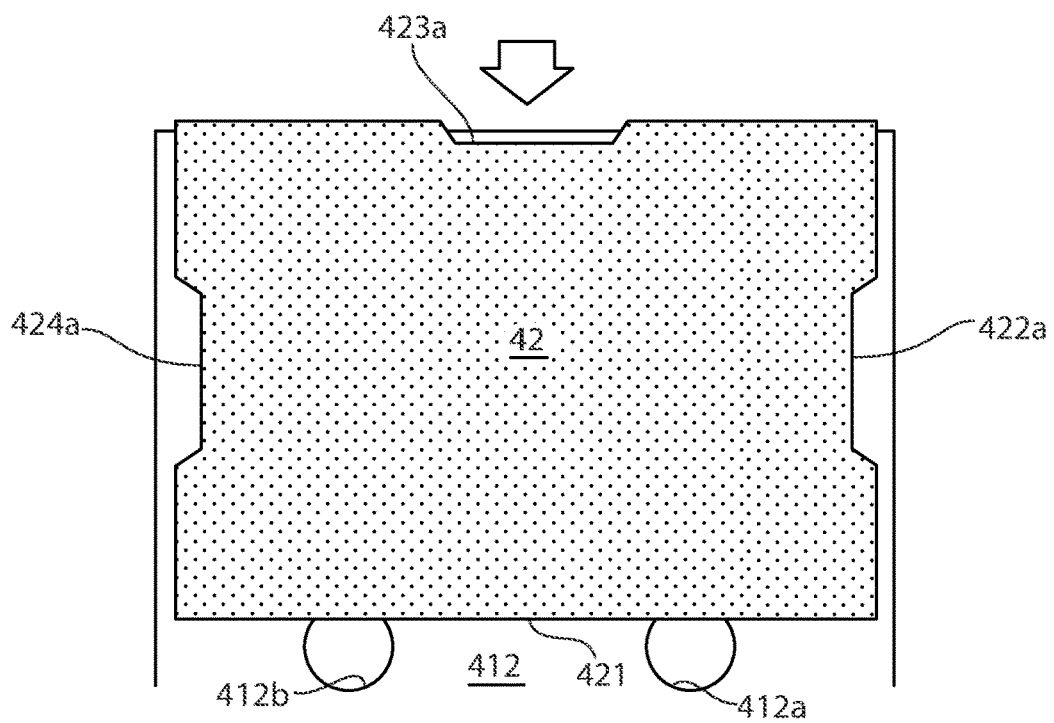
FIG. 10 is a view for explaining the operation of attaching the connector reinforcing plate to the connector mounting portion when manufacturing the display device circuit board illustrated in FIG. 3.

Among these, FIGS. 9 and 10 illustrate a state in which the positional deviation of the connector reinforcing plate 42 in the Y direction is within the dimensional tolerance Ytol. However, FIGS. 11 and 12 illustrate a state in which the positional deviation of the connector reinforcing plate 42 in the Y direction deviates from the dimensional tolerance Ytol.

First, in the example illustrated in FIG. 9, the connector mounting portion 412 is exposed across the entirety of the upper side cutout 423a (refer to the open arrow). Thereby, in the dimension inspection process of the display device circuit board 40, it is easy to determine that the positional deviation of the connector reinforcing plate 42 in the Y direction is at least inside the dimensional tolerance Ytol, that is, it is easy to determine that the display device circuit board 40 is a satisfactory product. In general, because the constituent materials of the connector mounting portion 412 and the connector reinforcing plate 42 are different from each other, the color of the connector mounting portion 412 and the connector reinforcing plate 42 and the way in which light is reflected are often different. Therefore, whether or not the connector mounting portion 412 is exposed at the upper side cutout 423a can be easily determined by visual observation or from a camera image. Consequently, this can increase the efficiency and accuracy of the inspection process.

Next, in the example illustrated in FIG. 10, the connector mounting portion 412 is exposed at a portion of the upper side cutout 423a (refer to the open arrow). As a result, it can be easily determined that the upper positional deviation of the connector reinforcing plate 42 is within the dimensional tolerance Ytol.

Figure 11:
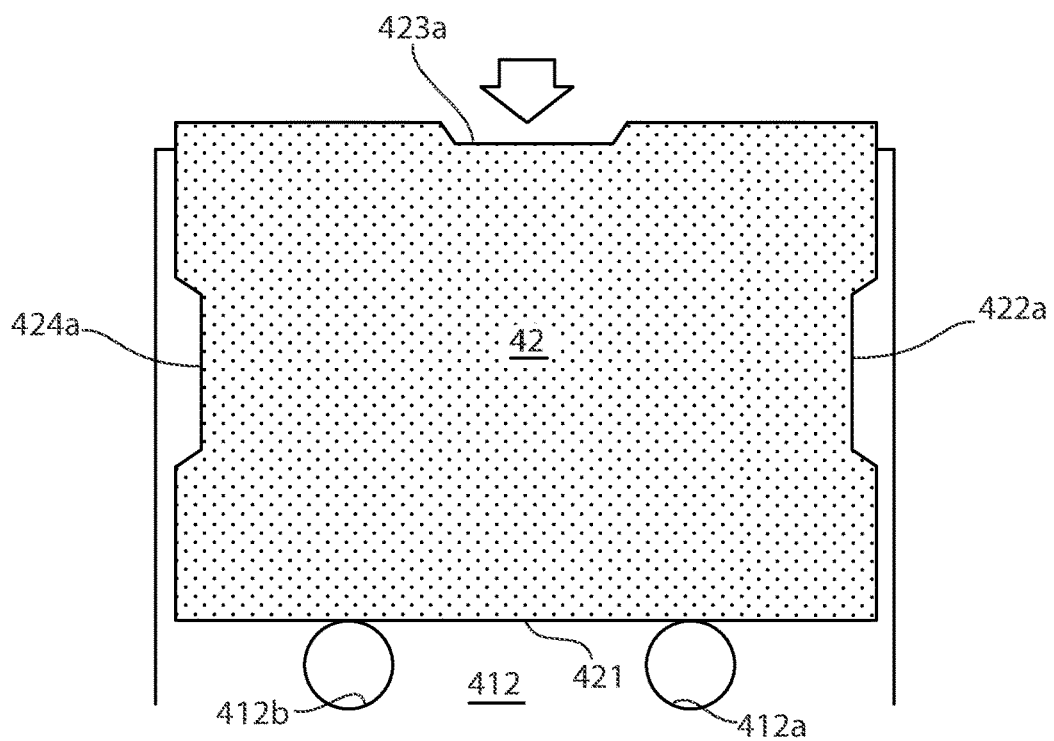
FIG. 11 is a view for explaining the operation of attaching the connector reinforcing plate to the connector mounting portion when manufacturing the display device circuit board illustrated in FIG. 3.
Figure 12:
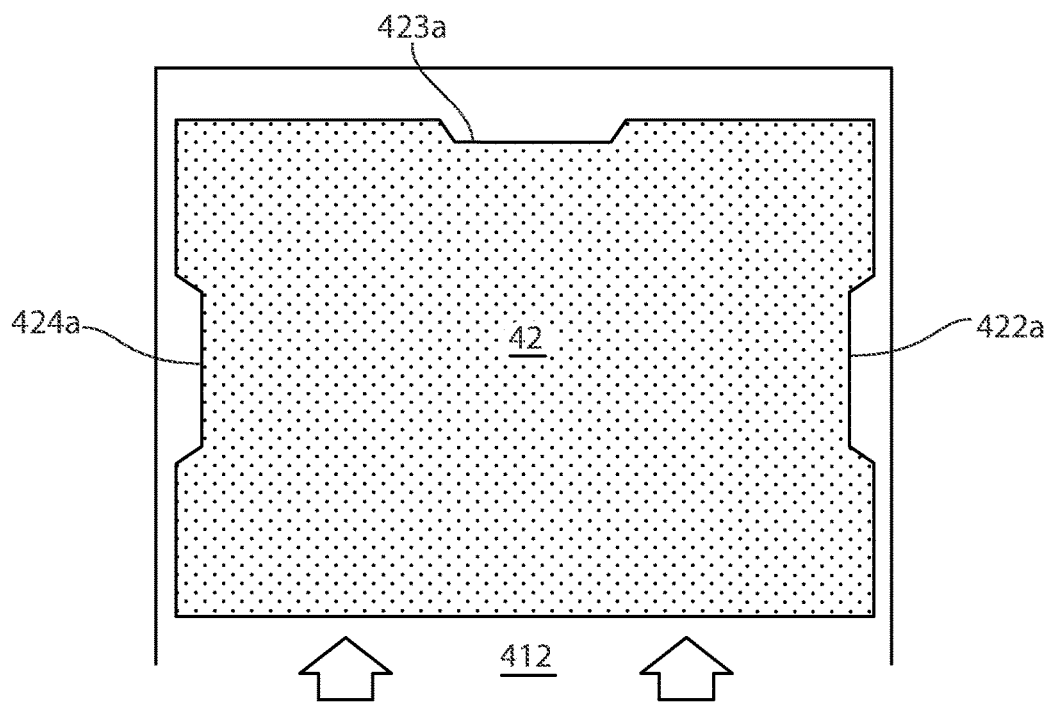
FIG. 12 is a view for explaining the operation of attaching the connector reinforcing plate to the connector mounting portion when manufacturing the display device circuit board illustrated in FIG. 3.

On the other hand, in FIG. 11, the connector mounting portion 412 is not exposed at the upper side cutout 423a (refer to the open arrow). As a result, it can be easily determined that the positional deviation of the upper portion of the connector reinforcing plate 42 deviates from the dimensional tolerance Ytol.

However, the dimensional tolerance Ytol of the lower positional deviation when the connector reinforcing plate 42 is adhered is restricted on the basis of the allowable amount of positional deviation with respect to the connector 44. That is, if the positional deviation of the connector reinforcing plate 42 becomes excessively large, because the function of reinforcing the part to which the connector 44 is attached is lost, the dimensional tolerance Ytol of the lower positional deviation is restricted on the basis of the range over which such a function is secured.

First, let Yh be the design length in the Y direction of the connector reinforcing plate 42 (refer to FIG. 7).

At this time, the design distance Yk1 between the center of the openings 412*a* and 412*b* formed in the connector mounting portion 412 and the upper side 4123 is obtained as the sum of the length Yh and the clearance Yc (Yh+Yc).

Further, the radius rk (refer to FIG. 8) of each of the openings 412*a* and 412*b* is set as the dimensional tolerance Ytol of the lower positional deviation.

By providing the openings 412*a* and 412*b* whose positions and sizes have been determined in this way, the connector mounting portion 412 is provided with a function of improving the positioning accuracy.

Next, the operation of the openings 412*a* and 412*b* will be described.

First, in FIGS. 9 and 10, a portion of the openings 412*a* and 412*b* protrudes from the lower side 421 of the connector reinforcing plate 42. In other words, a portion of the openings 412*a* and 412*b* is hidden by the connector reinforcing plate 42. Thereby, in the dimension inspection process of the display device circuit board 40, it is easy to determine that the lower positional deviation of the connector reinforcing plate 42 is within the dimensional tolerance Ytol, that is, it is easy to determine that the display device circuit board 40 is a satisfactory product. Because the base of the connector mounting portion 412 can be seen in the openings 412*a* and 412*b*, by making the constituent material of the base of the connector mounting portion 412 different from the constituent material of the connector reinforcing plate 42, it is easy to determine visually and from camera images. Consequently, this can increase the efficiency and accuracy of the inspection process.

In contrast, in FIG. 11, the openings 412*a* and 412*b* in their entirety protrude from the lower side 421 of the connector reinforcing plate 42. Consequently, it can be easily determined that the displacement of the lower position of the connector reinforcing plate 42 deviates from the dimensional tolerance Ytol.

Also, in FIG. 12, the entirety of the openings 412*a* and 412*b* is hidden by the connector reinforcing plate 42 (refer to the outlined arrow). Consequently, it can be easily determined that the displacement of the lower position of the connector reinforcing plate 42 deviates from the dimensional tolerance Ytol.

In the case where the dimensional tolerance Ytol of the upper positional deviation and the dimensional tolerance Ytol of the lower positional displacement are the same, it is possible to easily inspect both the upper positional deviation and the lower positional deviation even with only the openings 412*a* and 412*b*.

However, in the case where the dimensional tolerance Ytol of the upper positional deviation and the dimensional tolerance Ytol of the lower positional displacement are different from each other, by providing both the openings 412*a* and 412*b* and the upper side cutout 423*a*, it becomes possible to inspect both the upper positional deviation and the lower positional deviation.

In addition, the dimensional tolerance Xtol of the left positional deviation when the connector reinforcing plate 42 is adhered is restricted on the basis of the allowable amount of positional deviation with respect to the connector 44. That is, if the positional deviation of the connector reinforcing plate 42 becomes excessively large, because the function of reinforcing the part to which the connector 44 is attached is lost, the dimensional tolerance Xtol of the right positional deviation is restricted on the basis of the range over which such a function is secured.

The dimensional tolerance Xtol of the connector reinforcing plate 42 is set from the left side 424 toward the left in FIG. 8.

The design distance between the left side 4124 of the connector mounting portion 412 and the left side 424 of the connector reinforcing plate 42 is set as a clearance Xc.

At this time, the design value of the depth Xk of the left side cutout 424*a* formed in the connector reinforcing plate 42 is obtained as the difference (Xtol−Xc) between the dimensional tolerance Xtol and the clearance Xc. Therefore, by providing the left side cutout 424*a* having the depth Xk, the connector reinforcing plate 42 is provided with a function of improving the positioning accuracy at least on the left side.

Next, the operation of the left side cutout 424*a* will be described.

Figure 13:
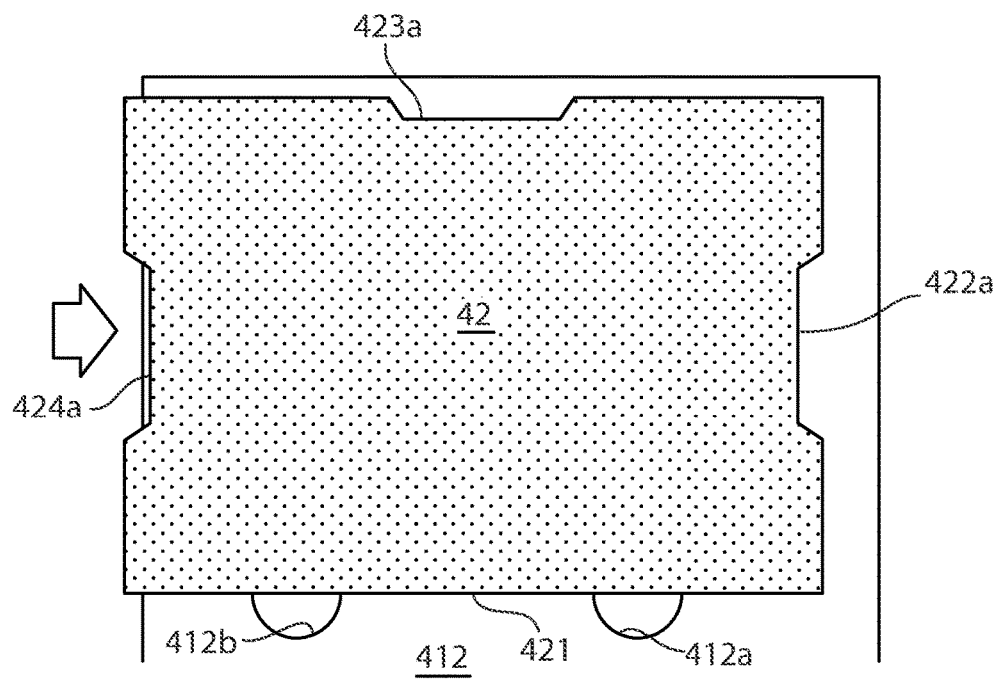
FIG. 13 is a view for explaining the operation of attaching the connector reinforcing plate to the connector mounting portion when manufacturing the display device circuit board illustrated in FIG. 3.
Figure 14:
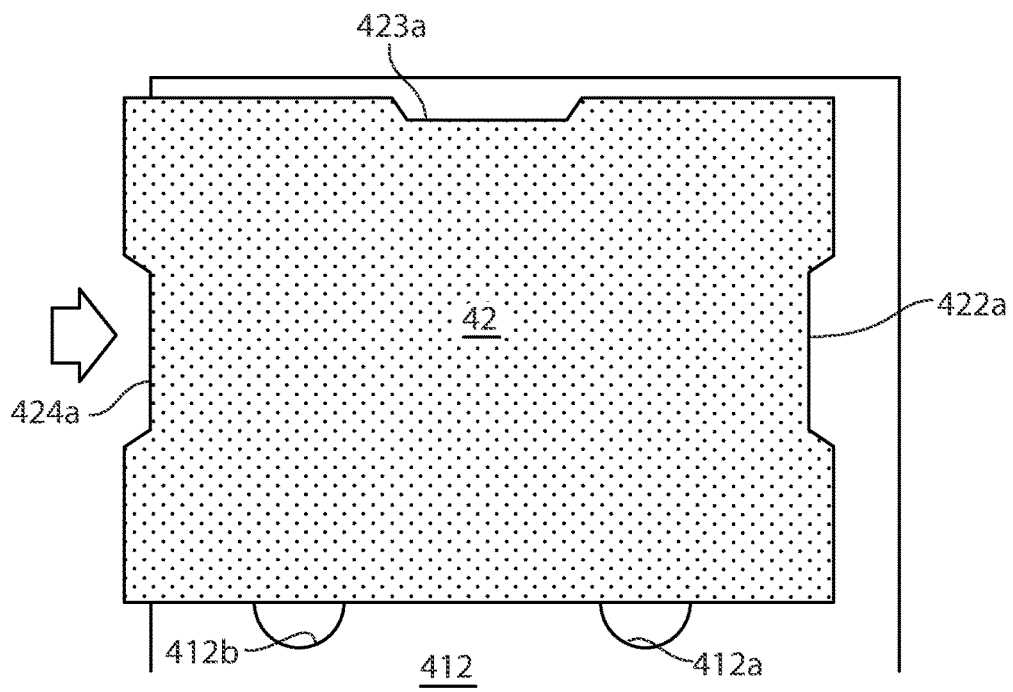
FIG. 14 is a view for explaining the operation of attaching the connector reinforcing plate to the connector mounting portion when manufacturing the display device circuit board illustrated in FIG. 3.

FIG. 13 and FIG. 14 are each a view for explaining an operation of adhering the connector reinforcing plate 42 to the connector mounting portion 412 when manufacturing the display device circuit board 40 illustrated in FIG. 3. In FIG. 13 and FIG. 14, dots denote the connector reinforcing plate 42.

Among these, FIG. 13 and FIG. 9 described above illustrate a state in which the positional deviation of the connector reinforcing plate 42 in the X direction is within the dimensional tolerance Xtol. However, FIG. 14 illustrates a state in which the positional deviation of the connector reinforcing plate 42 in the X direction deviates from the dimensional tolerance Xtol.

First, in FIG. 9, the connector mounting portion 412 is exposed across the entirety of the left side cutout 424*a*. As a result, in the dimensional inspection step of the display device circuit board 40, it is easy to determine that the positional deviation of the connector reinforcing plate 42 in the X direction is at least inside the dimensional tolerance Xtol, that is, it is easy to determine that the display device circuit board 40 is a satisfactory product.

Next, in FIG. 13, the connector mounting portion 412 is exposed at a portion of the left side cutout 424*a* (refer to the open arrow). As a result, it can be easily determined that the left positional deviation of the connector reinforcing plate 42 is within the dimensional tolerance Xtol.

On the other hand, in FIG. 14, the connector mounting portion 412 is not exposed at the left side cutout 424*a* (refer to the open arrow). As a result, it can be easily determined that the left positional deviation of the connector reinforcing plate 42 is outside the dimensional tolerance Xtol.

Furthermore, the dimensional tolerance Xtol of the right positional deviation when the connector reinforcing plate 42 is adhered is restricted on the basis of the allowable amount of positional deviation with respect to the connector 44.

Moreover, a design distance between the right side 4122 of the connector mounting portion 412 and the right side 422 of the connector reinforcing plate 42 is set as a clearance Xc.

Therefore, the design value of the depth Xk of the right side cutout 422a formed in the connector reinforcing plate 42 is obtained as the difference (Xtol−Xc) between the dimensional tolerance Xtol and the clearance Xc. Therefore, by providing the right side cutout 422a having the depth Xk, the connector reinforcing plate 42 is provided with a function of improving the positioning accuracy at least on the right side.

Because the action of the right side cutout 422a is the same as the action of the left side cutout 424a, explanation thereof will be omitted.

In manufacturing the display device circuit board 40 as described above, because it is possible to easily determine the degree of positional deviation of the connector reinforcing plate 42 on the basis of the appearance of the cutouts formed in the connector reinforcing plate 42 and the openings formed in the connector mounting portion 412, it is possible to efficiently and accurately perform the inspection process. As a result, it is possible to adhere the connector reinforcing plate 42 to the connector mounting portion 412 with high accuracy.

In addition, such cutouts and openings are particularly effective when it is difficult to print an alignment mark on the flexible substrate 41. That is, in the case where the flexible substrate 41 has a dark color such as black, it is difficult to print the alignment mark; however, even in such a case, the above effect can be obtained without using the alignment mark.

Moreover, in the case where it is not necessary for the attachment position of the connector reinforcing plate 42 to have high precision in both the Y direction and the X direction, the position of the cutouts or the openings should be set so as to increase the positioning accuracy in only one of the Y direction and the X direction.

Modification Example of Connector Mounting Portion

Next, a modification example of the display device circuit board 40 will be described in detail.

Figure 15:
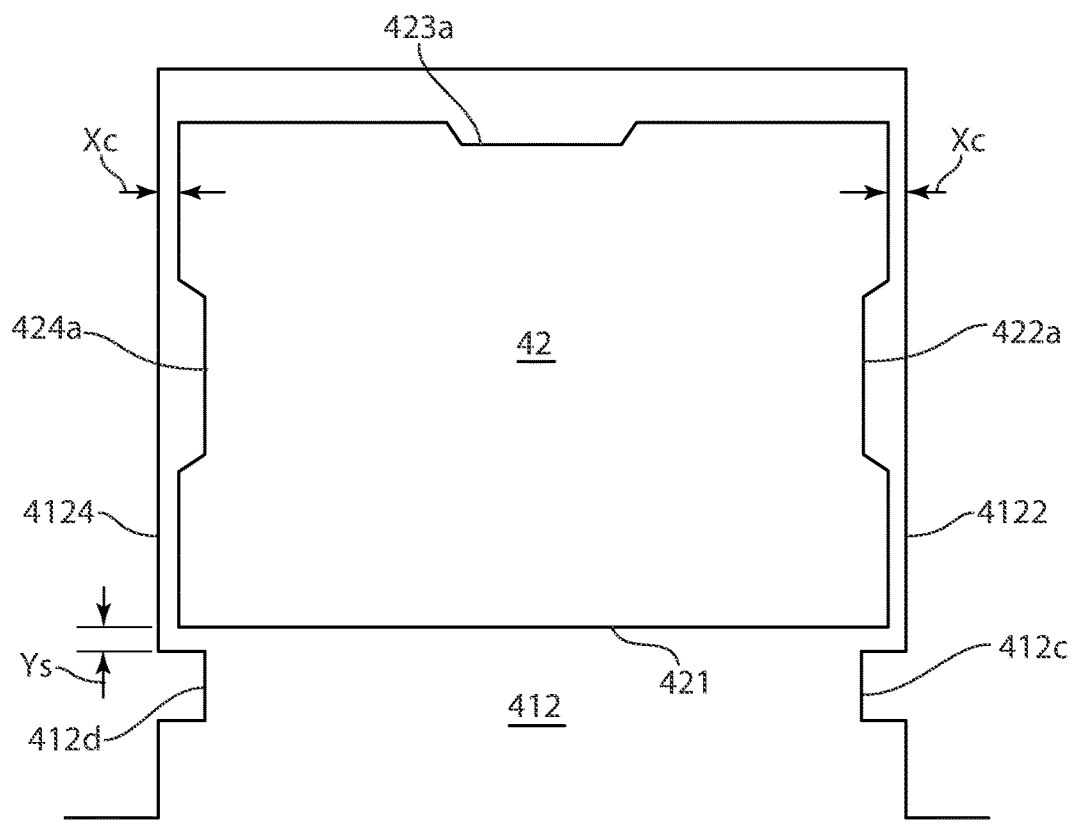
FIG. 15 is a plan view of a modification example of the connector mounting portion illustrated in FIG. 7.

FIG. 15 is a plan view illustrating a modification example of the connector mounting portion 412 illustrated in FIG. 7.

Hereinafter, a modification example will be described. In the following description, differences from the connector mounting portion 412 illustrated in FIG. 7 will be mainly described, and descriptions of similar points will be omitted.

This modification example is the same as the connector mounting portion 412 illustrated in FIG. 7 except that two cutouts 412c and 412d illustrated in FIG. 15 are provided instead of the two openings 412a and 412b illustrated in FIG. 7.

Among them, the cutout 412c is a portion formed by cutting out a part of the right side 4122 of the connector mounting portion 412. On the other hand, the cutout 412d is a part formed by cutting out a part of the left side 4124 of the connector mounting portion 412. That is, the connector mounting portion 412 includes the cutouts 412c and 412d.

The distance Ys from each of the cutouts 412c and 412d to the designed position of the lower side 421 of the connector reinforcing plate 42 is set as the dimensional tolerance Ytol for the lower positional deviation.

Further, the depth of the cutouts 412c and 412d is set to a value larger than the clearance Xc.

By providing the cutouts 412c and 412d whose positions and sizes are determined in this way, the connector mounting portion 412 is provided with a function of improving the positioning accuracy.

Also in the modification example described above, in manufacturing the display device circuit board 40, because it is possible to easily determine the degree of positional deviation of the connector reinforcing plate 42 on the basis of the appearance of the cutouts formed in the connector mounting portion 412 (how they are hidden by the connector reinforcing plate 42), the inspection process can be efficiently and accurately performed.

Also in this modification example, the same effect as the connector mounting portion 412 illustrated in FIG. 7 is obtained. That is, because it is possible to easily determine the degree of misalignment of the connector reinforcing plate 42 on the basis of the appearance of the cutouts 412c and 412d formed in the connector mounting portion 412, the inspection process can be efficiently and accurately performed.

[3] Next, the connector 44, the light emitters 45, the active element 416a, the passive elements 416b and the like are mounted.

In this manner, the display device circuit board 40 is obtained.

Electronic Device

Next, an embodiment of the electronic device of the invention will be described. The electronic device according to this embodiment includes the display device according to the above embodiment.

Figure 16:
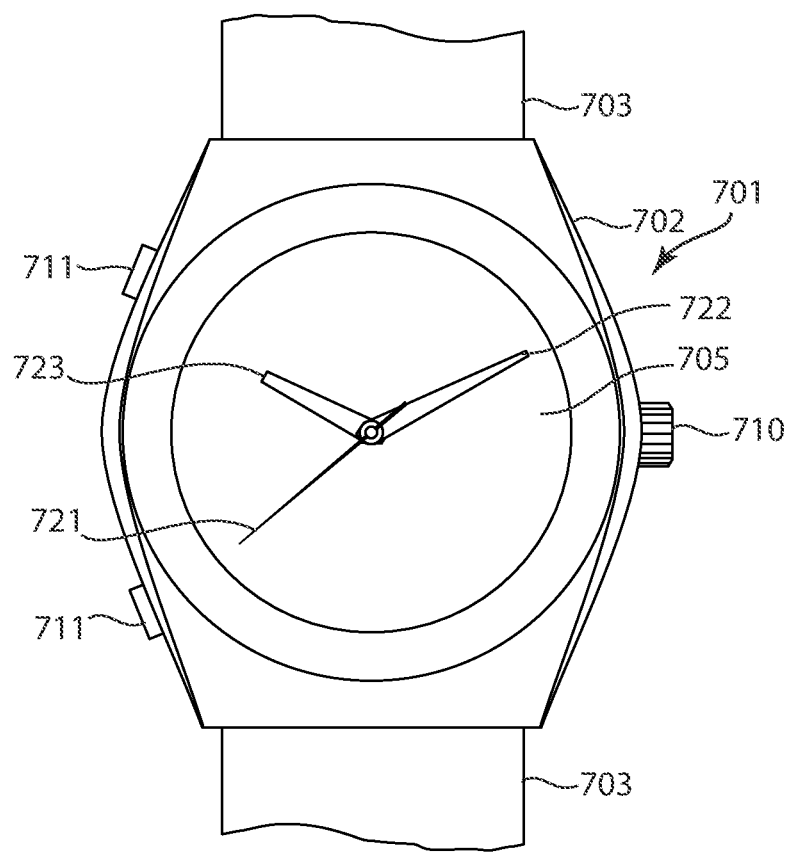
FIG. 16 is a front view of a wristwatch to which an embodiment of the electronic device of the invention is applied.

FIG. 16 is a front view of a wristwatch to which the electronic device according to an embodiment of the invention is applied.

A wristwatch 701 (the electronic device according to an embodiment of the invention) illustrated in FIG. 16 includes a watch case 702 and a pair of bands 703 connected to the watch case 702. An electrophoretic display device 705 (the display device according to the embodiment of the invention), a second hand 721, a minute hand 722, and an hour hand 723 are provided on the front face of the watch case 702. A crown 710 and operation buttons 711 as operating elements are provided on the side surface of the watch case 702.

Figure 17:
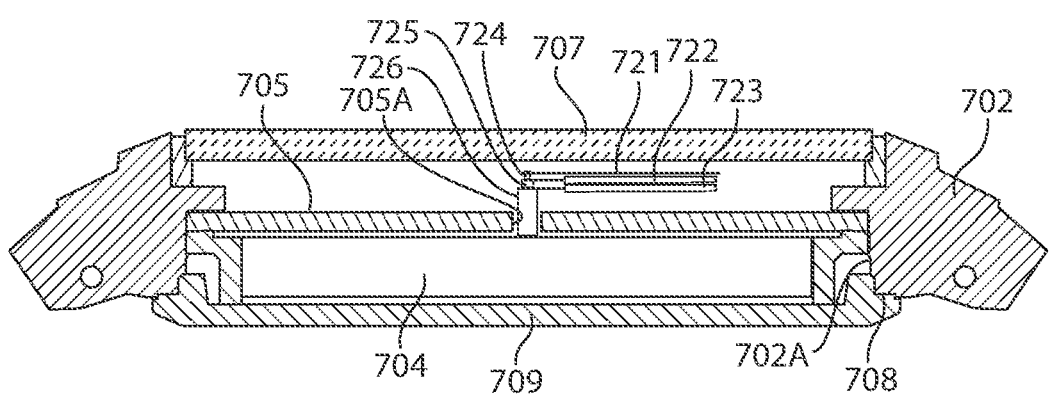
FIG. 17 is a side cross-sectional view of the wristwatch illustrated in FIG. 16.

FIG. 17 is a side sectional view of the wristwatch illustrated in FIG. 16.

A housing portion 702A is provided inside the watch case 702 illustrated in FIG. 17. A movement 704 and the electrophoretic display device 705 are housed in the housing portion 702A. A transparent cover 707 formed of glass or resin is provided on one end side (clock front side) of the housing portion 702A. A back cover 709 is screwed via a packing 708 to the other end side (clock back side) of the housing portion 702A, and the watch case 702 is sealed by the back cover 709 and the transparent cover 707.

The movement 704 has a hand movement mechanism (not illustrated) to which analog pointers formed of the second hand 721, the minute hand 722 and the hour hand 723 are connected. The hand movement mechanism drives and rotates the analog pointers and functions as a time display section for displaying the set time.

The electrophoretic display device 705 is disposed on the clock front side of the movement 704 and forms the display portion of the wristwatch 701. Although the display surface of the electrophoretic display device 705 is circular in this case, it may be another shape such as a regular octagonal shape, a hexadecagonal shape, or the like. A through hole 705A that penetrates the electrophoretic display device 705 from the front surface to the back surface is formed in the center portion of the electrophoretic display device 705. The respective shafts of a second wheel 724, a minute wheel 725 and an hour wheel 726 of a hand movement mechanism (not illustrated) of the movement 704 are inserted in the through hole 705A. The second hand 721, the minute hand 722, and the hour hand 723 are attached to the tips of the respective shafts.

Although the electrophoretic display device 705 illustrated in FIGS. 16 and 17 displays, for example, an image of a dial, in addition to the dial, a second hand, a minute hand, and an hour hand may also be displayed. In such a case, the second hand 721, the minute hand 722, the hour hand 723, the movement 704, and the like described above can be omitted. Also, instead of a so-called analog display for displaying the second hand, the minute hand, and the hour hand, there may be a digital display of the timepiece.

The electronic device of the invention is also applicable to devices other than clocks.

Figure 18:
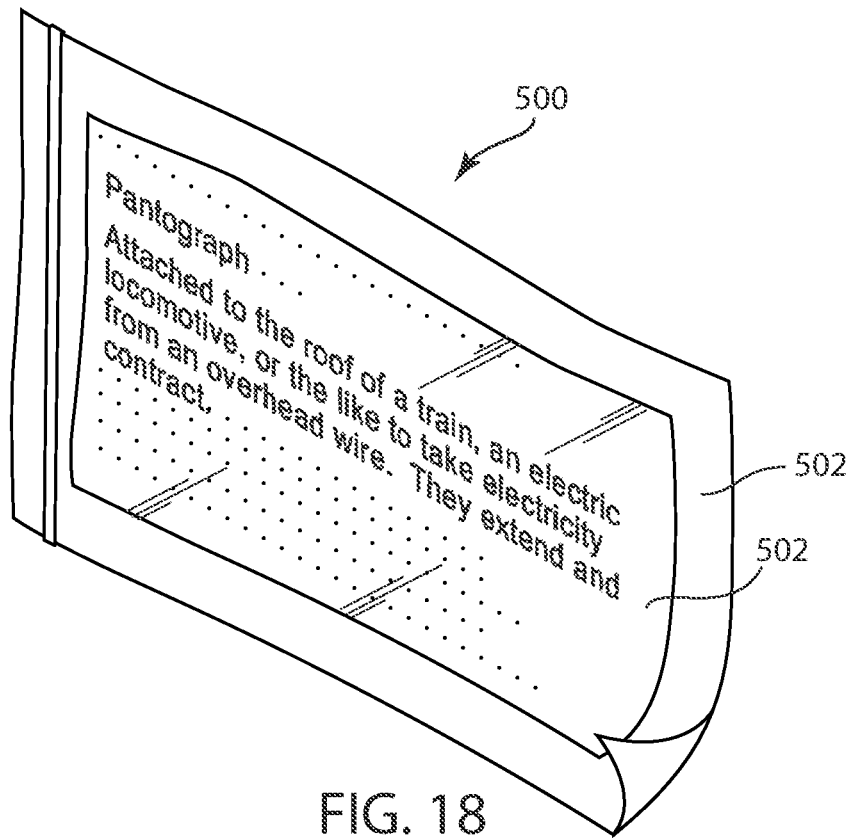
FIG. 18 is a perspective view of a structure of an electronic paper sheet to which an embodiment of the electronic device of the invention is applied.

FIG. 18 is a perspective view illustrating a configuration of an electronic paper sheet to which the electronic device according to the embodiment of the invention is applied.

An electronic paper sheet 500 illustrated in FIG. 18 includes a display portion 501 (the display device according to the embodiment of the invention). The electronic paper sheet 500 is flexible and has a main body 502 made of a rewritable sheet having texture and flexibility similar to that of conventional paper.

Figure 19:
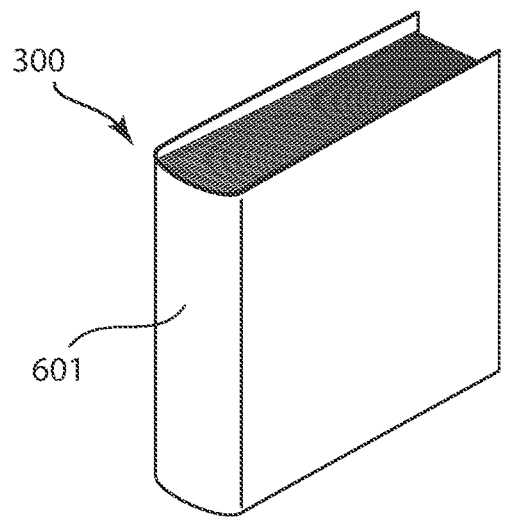
FIG. 19 is a perspective view of a structure of an electronic notebook to which an embodiment of the electronic device of the invention is applied.

FIG. 19 is a perspective view of a structure of an electronic notebook to which the electronic device according to the embodiment of the invention is applied.

An electronic notebook 600 illustrated in FIG. 19 is one in which the electronic paper sheet 500 illustrated in FIG. 18 is provided in a plurality and the plurality of the electronic paper sheets 500 are bundled and sandwiched between covers 601. The covers 601 include a display data input device (not illustrated) for inputting display data sent from, for example, an external device. Thus, according to the display data, it is possible to change or update the display content while keeping the electronic paper sheets bundled.

By providing electronic devices such as the wristwatch 701, the electronic paper sheet 500, and the electronic notebook 600 as described above with the display device of the invention, because it is possible to enjoy the effect achieved by the display device circuit board of the invention, the electronic devices become compact and highly reliable.

The display device circuit board, the display device, and the electronic device of the invention have been described on the basis of the illustrated embodiments, but the invention is not limited thereto.

For example, in a display device circuit board, a display device, and an electronic device, the configuration of each part can be replaced by an arbitrary configuration having the same function or another arbitrary configuration can be added.

Further, the display device to which the display device circuit board can be applied is not limited to the electrophoretic display device, and may be another display device (for example, a reflection type liquid crystal display device) adopting a front light system.

The entire disclosure of Japanese Patent Application No. 2016-254148, filed Dec. 27, 2016 is expressly incorporated by reference herein.

What is claimed is:

1. A display device circuit board comprising:
   a flexible substrate having a base portion, a connector mounting portion disposed along a first direction from the base portion, a light emitter mounting portion, and an arm portion connecting the base portion and the light emitter mounting portion; and
   a connector reinforcing plate provided on one main surface of the connector mounting portion,
   wherein a gap is interposed between the light emitter mounting portion and the connector mounting portion and between the arm portion and the connector mounting portion.

2. The display device circuit board according to claim 1, wherein, in the flexible substrate, the arm portion includes two arm portions, and
   wherein the two arm portions are positioned on either side of the connector mounting portion in a second direction that intersects with the first direction.

3. The display device circuit board according to claim 1, wherein the flexible substrate further includes a pixel circuit connection portion that protrudes from the base portion in a direction opposite to the first direction.

4. The display device circuit board according to claim 1, wherein the flexible substrate further includes a support portion located at a side opposite to the base portion in the first direction.

5. The display device circuit board according to claim 1 further comprising
   a light emitter reinforcing plate provided on one main surface of the light emitter mounting portion.

6. The display device circuit board according to claim 1, wherein the connector reinforcing plate has a cutout formed at an outer edge thereof.

7. The display device circuit board according to claim 1, wherein the connector mounting portion has an opening or a cutout.

8. The display device circuit board according to claim 1 further comprising
   a connector provided on the other main surface of the connector mounting portion.

9. The display device circuit board according to claim 1 further comprising
   a light emitter provided on the other main surface of the light emitter mounting portion.

10. A display device comprising a display device circuit board comprising:
    a flexible substrate having a base portion, a connector mounting portion disposed along a first direction from the base portion, a light emitter mounting portion, and an arm portion connecting the base portion and the light emitter mounting portion; and
    a connector reinforcing plate provided on one main surface of the connector mounting portion,
    wherein a gap is interposed between the light emitter mounting portion and the connector mounting portion and between the arm portion and the connector mounting portion.

11. The display device according to claim 10, wherein the flexible substrate is bent so that the other main surface of the connector mounting portion and one main surface of the light emitter mounting portion face each other.

12. An electronic device comprising a display device comprising a display device circuit board comprising:
    a flexible substrate having a base portion, a connector mounting portion disposed along a first direction from the base portion, a light emitter mounting portion, and an arm portion connecting the base portion and the light emitter mounting portion; and
    a connector reinforcing plate provided on one main surface of the connector mounting portion,
    wherein a gap is interposed between the light emitter mounting portion and the connector mounting portion and between the arm portion and the connector mounting portion.

* * * * *